United States Patent
Heinze et al.

(10) Patent No.: US 10,839,152 B2
(45) Date of Patent: *Nov. 17, 2020

(54) MERE-PARSING WITH BOUNDARY AND SEMANTIC DRIVEN SCOPING

(71) Applicant: Optum360, LLC, Eden Prairie, MN (US)

(72) Inventors: Daniel T. Heinze, San Diego, CA (US); Mark L. Morsch, San Diego, CA (US)

(73) Assignee: OPTUM360, LLC, Eden Prairie, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/454,731

(22) Filed: Jun. 27, 2019

(65) Prior Publication Data

US 2019/0317989 A1 Oct. 17, 2019

Related U.S. Application Data

(63) Continuation of application No. 16/050,718, filed on Jul. 31, 2018, now Pat. No. 10,354,005, which is a continuation of application No. 14/713,672, filed on May 15, 2015, now Pat. No. 10,061,764, which is a continuation of application No. 13/016,764, filed on Jan. 28, 2011, now Pat. No. 9,063,924, which is a continuation of application No. 11/735,278, filed on Apr. 13, 2007, now Pat. No. 7,908,552.

(51) Int. Cl.
| | |
|---|---|
| *G06F 17/00* | (2019.01) |
| *G06F 40/205* | (2020.01) |
| *G06F 40/30* | (2020.01) |
| *G06F 40/211* | (2020.01) |
| *G06F 40/289* | (2020.01) |

(52) U.S. Cl.
CPC .......... *G06F 40/205* (2020.01); *G06F 40/211* (2020.01); *G06F 40/289* (2020.01); *G06F 40/30* (2020.01)

(58) Field of Classification Search
CPC .... G06F 40/205; G06F 40/211; G06F 40/289; G06F 40/30
USPC ........................................................ 715/256
See application file for complete search history.

(56) References Cited

U.S. PATENT DOCUMENTS

| | | |
|---|---|---|
| 3,996,672 A | 12/1976 | Osofsky et al. |
| 5,307,262 A | 4/1994 | Ertel |
| 5,325,293 A | 6/1994 | Dorne |
| 5,483,443 A | 1/1996 | Milstein et al. |
| 5,583,758 A | 12/1996 | McIlroy et al. |

(Continued)

OTHER PUBLICATIONS

Kaiser et al., Parallel and Distributed Incremental Attribute Evaluation Algorithms for Multiuser Software Development Environments, ACM 1993, pp. 47-92. (Year: 1993).*

(Continued)

*Primary Examiner* — Cong-Lac Huynh
(74) *Attorney, Agent, or Firm* — Dorsey & Whitney LLP

(57) ABSTRACT

Methods, systems and computer program products for implementing a mere-parser are disclosed. Text data is processed to generate one or more parse items. A boundary based attribute associated with one of the parse items is identified, and the identified mere attribute is associated with one or more of the remaining parse items that is not blocked from associated with the boundary based attribute.

20 Claims, 8 Drawing Sheets

(56) References Cited

U.S. PATENT DOCUMENTS

| | | |
|---|---|---|
| 5,594,638 A | 1/1997 | Iliff |
| 5,619,709 A | 4/1997 | Caid et al. |
| 5,675,819 A | 10/1997 | Schuetze |
| 5,680,511 A | 10/1997 | Baker et al. |
| 5,778,157 A | 7/1998 | Oatman et al. |
| 5,794,178 A | 8/1998 | Caid et al. |
| 5,809,476 A | 9/1998 | Ryan |
| 5,873,056 A | 2/1999 | Liddy et al. |
| 5,900,871 A | 5/1999 | Atkin et al. |
| 5,941,820 A | 8/1999 | Zimmerman |
| 5,963,894 A | 10/1999 | Richardson et al. |
| 5,995,955 A | 11/1999 | Oatman et al. |
| 6,049,390 A * | 4/2000 | Notredame ............ G06K 15/00 358/1.15 |
| 6,055,494 A | 4/2000 | Friedman |
| 6,063,132 A * | 5/2000 | DeCamp ............... G06F 30/398 716/112 |
| 6,081,774 A | 6/2000 | de Hita et al. |
| 6,137,911 A | 10/2000 | Zhilyaev |
| 6,182,029 B1 | 1/2001 | Friedman |
| 6,389,405 B1 | 5/2002 | Oatman et al. |
| 6,498,982 B2 | 12/2002 | Bellesfield et al. |
| 6,522,939 B1 | 2/2003 | Strauch et al. |
| 6,529,876 B1 | 3/2003 | Dart et al. |
| H2098 H | 3/2004 | Morin |
| 6,708,186 B1 | 3/2004 | Claborn et al. |
| 6,866,510 B2 | 3/2005 | Polanyi et al. |
| 6,915,254 B1 | 7/2005 | Heinze et al. |
| 6,980,875 B1 | 12/2005 | Stromberg |
| 7,043,426 B2 | 5/2006 | Roberge et al. |
| 7,113,905 B2 | 9/2006 | Parkinson et al. |
| 7,174,507 B2 | 2/2007 | Baudin et al. |
| 7,359,861 B2 | 4/2008 | Lee |
| 7,360,151 B1 | 4/2008 | Froloff |
| 7,369,998 B2 | 5/2008 | Sarich et al. |
| 7,401,077 B2 | 7/2008 | Bobrow et al. |
| 7,493,326 B2 | 2/2009 | Bishop et al. |
| 7,516,125 B2 | 4/2009 | Rao et al. |
| 7,610,190 B2 | 10/2009 | Polanyi et al. |
| 7,624,027 B1 | 11/2009 | Stern et al. |
| 7,653,641 B2 | 1/2010 | Theissen et al. |
| 7,720,723 B2 | 5/2010 | Dicker et al. |
| 7,827,165 B2 | 11/2010 | Abernethy et al. |
| 7,865,358 B2 | 1/2011 | Green et al. |
| 7,908,552 B2 | 3/2011 | Heinze |
| 7,949,538 B2 | 5/2011 | Heinze |
| 8,078,454 B2 | 12/2011 | Pouzin |
| 8,140,323 B2 | 3/2012 | Johnson et al. |
| 8,438,496 B1 | 5/2013 | Hegde |
| 8,682,823 B2 | 3/2014 | Heinze et al. |
| 8,719,703 B2 | 5/2014 | Bier |
| 8,731,954 B2 | 5/2014 | Heinze et al. |
| 9,063,924 B2 | 6/2015 | Heinze et al. |
| 9,110,756 B1 | 8/2015 | Guo et al. |
| 9,804,772 B2 | 10/2017 | Oh et al. |
| 9,946,846 B2 | 4/2018 | Morsch et al. |
| 10,019,261 B2 | 7/2018 | Heinze et al. |
| 10,061,764 B2 | 8/2018 | Heinze et al. |
| 10,216,901 B2 | 2/2019 | Heinze et al. |
| 2002/0010714 A1 | 1/2002 | Hetherington |
| 2002/0035581 A1 | 3/2002 | Reynar et al. |
| 2002/0040359 A1* | 4/2002 | Green .................. G06F 16/972 |
| 2002/0085040 A1 | 7/2002 | Krolczyk et al. |
| 2002/0128819 A1 | 9/2002 | Jessee et al. |
| 2002/0156810 A1 | 10/2002 | Holland et al. |
| 2003/0018251 A1 | 1/2003 | Solomon |
| 2003/0033347 A1 | 2/2003 | Bolle et al. |
| 2003/0074222 A1 | 4/2003 | Rosow et al. |
| 2003/0115039 A1 | 6/2003 | Wang |
| 2003/0115195 A1 | 6/2003 | Fogel et al. |
| 2003/0217052 A1 | 11/2003 | Rubenczyk et al. |
| 2004/0059577 A1 | 3/2004 | Pickering |
| 2004/0064808 A1 | 4/2004 | Kira |
| 2004/0093293 A1 | 5/2004 | Cheung |
| 2004/0117734 A1 | 6/2004 | Krickhahn |
| 2004/0172297 A1 | 9/2004 | Rao et al. |
| 2004/0249638 A1 | 12/2004 | Wang |
| 2004/0254816 A1 | 12/2004 | Myers |
| 2005/0010421 A1 | 1/2005 | Watanabe et al. |
| 2005/0071185 A1 | 3/2005 | Thompson |
| 2005/0091067 A1 | 4/2005 | Johnson |
| 2005/0261910 A1 | 11/2005 | Percoda et al. |
| 2005/0273361 A1 | 12/2005 | Busch |
| 2006/0000257 A1 | 1/2006 | Samadpour et al. |
| 2006/0059021 A1 | 3/2006 | Yulman et al. |
| 2006/0129922 A1 | 6/2006 | Walker |
| 2006/0134750 A1 | 6/2006 | Liu et al. |
| 2006/0149565 A1 | 7/2006 | Riley |
| 2006/0247949 A1 | 11/2006 | Shorrosh |
| 2007/0061348 A1 | 3/2007 | Holland et al. |
| 2007/0094030 A1 | 4/2007 | Xu |
| 2007/0226211 A1 | 9/2007 | Heinze et al. |
| 2007/0237377 A1 | 10/2007 | Oosawa |
| 2007/0294200 A1 | 12/2007 | Au |
| 2008/0004505 A1 | 1/2008 | Kapit et al. |
| 2008/0033759 A1 | 2/2008 | Finlay |
| 2008/0222518 A1 | 9/2008 | Walker |
| 2008/0256108 A1 | 10/2008 | Heinze et al. |
| 2008/0256329 A1 | 10/2008 | Heinze et al. |
| 2008/0282153 A1 | 11/2008 | Kindeberg et al. |
| 2009/0055477 A1 | 2/2009 | Flesher et al. |
| 2009/0070140 A1 | 3/2009 | Morsch et al. |
| 2009/0144617 A1 | 6/2009 | Funes et al. |
| 2009/0175550 A1 | 7/2009 | Taleb |
| 2010/0064131 A1 | 3/2010 | Spatscheck et al. |
| 2010/0070517 A1 | 3/2010 | Ghosh et al. |
| 2010/0082673 A1 | 4/2010 | Nakano et al. |
| 2010/0195909 A1 | 8/2010 | Wasson et al. |
| 2010/0257444 A1 | 10/2010 | Bever et al. |
| 2011/0093479 A1 | 4/2011 | Fuchs |
| 2012/0011084 A1 | 1/2012 | Gulwani et al. |
| 2012/0011470 A1 | 1/2012 | Oh et al. |
| 2012/0136863 A1 | 5/2012 | Bobick et al. |
| 2013/0103615 A1 | 4/2013 | Mun |
| 2013/0212508 A1 | 8/2013 | Barsoum et al. |
| 2013/0246480 A1 | 9/2013 | Lemcke et al. |
| 2013/0262125 A1 | 10/2013 | Tunstall-Pedoe |
| 2014/0074797 A1 | 3/2014 | Mcfarland |
| 2014/0074867 A1 | 3/2014 | Mcfarland |
| 2014/0164388 A1 | 6/2014 | Zhang et al. |
| 2016/0154585 A1* | 6/2016 | Tanaka ............... G06F 12/0897 711/156 |
| 2017/0046425 A1 | 2/2017 | Tonkin et al. |
| 2018/0197261 A1 | 7/2018 | Morsch et al. |
| 2018/0293071 A1 | 10/2018 | Heinze et al. |
| 2018/0341636 A1 | 11/2018 | Heinze et al. |
| 2019/0156939 A1 | 5/2019 | Heinze et al. |

OTHER PUBLICATIONS

Hunt et al., Extensible Language-Aware Merging, IEEE 2002, pp. 1-10. (Year: 2002).*

"HL7 Clinical Document Architecture, Release 2.0", Retrieved from the Internet URL: www.hl7.org/v3ballot/html/foundationdocuments/cda/cda.htm., [Retrieved Dec. 20, 2010], 190 pages.

"Introducing SNOMED CT", Retrieved from the Internet URL: www.ihtsdo.org/publications/introducing-snomed-ct/., [Retrieved Dec. 21, 2010], 2 pages.

"SNOMED Clinical Terms Basics", Retrieved from the Internet URL: www.ihtsdo.org/fileadmin/user_upload/Docs_01/Recourses/Introducing_SNOMED_CT/SNOMED_CT_Basics_IHTSDO_Taping_Aug08.pdf., [Retrieved Dec. 21, 2010], 82 pages.

"SNOMED Clinical Terms Fundamentals", Retrieved from the Internet URL: www.ihtsdo.org/fileadmin/user_upload/docs_01/SNOMED_Clinical_Terms_Fundamentals.pdf., [Retrieved Dec. 21, 2010], 56 pages.

"SNOMED Clinical Terms Overview", Retrieved from the Internet URL: www.ihtsdo.org/fileadmin/user_upload/Docs_01/Recourses/Introducing_SNOMED_CT/SNOMED_CT_Overview)_IHTSDO_Taping_Aug08.pdf., [Retrieved Dec. 21, 2010], 80 pages.

"SNOMED Clinical Terms User Guide Jan. 2010 International Release (US English)", Retrieved from the Internet URL: www.

(56) References Cited

OTHER PUBLICATIONS ihtsdo.org/fileadmin/user_upload/Docs_01/Publications/doc_userguide_current-en-US_INT_20100131.pdf., [Retrieved Dec. 21, 2010], 99 pages.
"SNOMED CT Browsers", Retrieved from the Internet URL: www.nim.nih.gov/research/umls/Snomed/snomed_browsers.html., [Retrieved Dec. 21, 2010], 2 pages.
"Value Proposition for SNOMED CT", Retrieved from the Internet URL: www.ihtsdo.org/fileadmin/user_upload/Docs_01/Publications/SNOMED_CT/SNOMED_CT_Benefits_v4.pdf., [Retrieved Dec. 21, 2010], 3 pages.
Aronow, et al., "A PC Classifier of Clinical Text Documents: Advanced Information Retrieval Technology Transfer", Journal of the American Medical Informatics Association, Amherst, MA, 1996, 1 page.
Aronow, et al., "Ad-Hoc Classification of Electronic Clinical Documents", D-Lib Magazine, Amherst, MA, Jan. 1997, 10 pages.
Aronow, et al., "Automated Classification of Encounter Notes in a Computer Based Medical Record", Amherst, MA, 5 pages.
Aronow, et al., "Automated Identification of Episodes of Asthma Exacerbation for Quality Measurement in a Computer-Based Medical Record", Brookline, MA and Amherst, MA., 5 pages.
Brigitte, Jorg et al., "Modeling the semantics of contextual and content-specific research metadata using ontology languages: issues on combining CERIF and OWL", International Conference on Computational Science; ICCS; Elsevier, 2012, pp. 1563-1570.
Corley, Courtney et al., "Measuring the Semantic Similarity of Texts", Proceeding of the ACL Workshop on Empirical Modeling of Semantic Equivalence and Entailment, Ann Arbor, Association for Computational Linguistics, Jun. 2005, pp. 13-18.
Croft, et al., "Effective Access to Distributed Heterogeneous Medical Text Databases", Amherst, MA, 1995, 1 page.
Dep. of Health & Human Services, "Rat-Stats Companion Manual", OIG Office of Audit Services, Sep. 2001, 56 pages.
Dep. of Health & Human Services, , "Rat-Stats User Guide", OIG Office of Audit Services., Sep. 2001, 108 pages.
Friedman, et al., "Natural Language Processing in an Operational Clinical Information System", Natural Language Engineering, vol. 1, May 1995, pp. 83-108 (26 pages).
Furuse, Osamu et al., "Constituent Boundary Parsing for Example-Based Machine Translation", Google, 1994, pp. 105-111 (7 pages).
Giunchiglia, Fausto , "Approximate Structure-Preserving Semantic Matching", Springer 2008, pp. 1217-1234. (Year: 2008),.
Gregory, Tom , "Interpreting Error Rates in Health Care Billing Audits", Journal of Health Care Compliance; vol. 5 No. 1, Jan. 2, 2003, pp. 4-8 (5 pages).
Hirsch, et al., "Suggesting Terms for Query Expansion in a Medical Information Retrieval System", AMIA Annual Symposium on Computer Application in Medical Care, 1995, p. 965.
Larkey, et al., "Automatic Assignment of ICD9 Codes to Discharge Summaries", Amherst, MA., 24 pages.
Lehnert, et al., "Inductive Text Classification for Medical Appointments", Journal for Experimental and Theoretical Artificial Intelligence 7(1), 1995, pp. 271-302 (39 pages).
Lenert, Leslie et al., "Automated Linkage of Free-text Descriptions of Patients with a Practice Guideline", Division of Clinical Pharmacology, Stanford University School of Medicine, Stanford, CA., 1993, pp. 274-278 (6 pages).
Neubauer, Aljoscha S. , "The EWMA Control Chart: Properties and Comparison with Other Quality-Control Procedures by Computer Simulation", Clinical Chemistry, 43:4, 1997, pp. 594-601 (8 pages).
Ranum, David L. , "Knowledge Based Understanding of Radiology Text", Department of Medical Informatics LDS Hospital/University of Utah Salt Lake City, UT, 1988, pp. 141-145 (6 pages).
Richardson, Stephen et al., "MindNet: Acquiring and Structuring Semantic Information from Text", Microsoft Research; ACM, 1998, pp. 1098-1102 (5 pages).
Sager, et al., "Automated Encoding into SNOMED III: A Preliminary Investigation", 18.sup.th Annual Symposium on Computer Application in Medical Care, New York, NY., 1994, pp. 230-234 (5 pages).
Sager, Naomi et al., "Natural Language Processing and the Representation of Clinical Data", Journal of American Medical Informatics Association, vol. 1 No. 2 New York, NY, 1994, pp. 142-160 (19 pages).
Shaikh, Mostafa et al., "Assessing Sentiment of Text by Semantic Dependency and Contextual Valence Analysis", Department of Information and Communication Engineering, University of Tokyo; Springer-Verlag Berlin Heidelberg, 2007, pp. 191-202 (12 pages).
Sneideman, et al., "Finding the Findings: Identification of Findings in Medical Literature Using Restricted Natural Language Processing", National Library of Medicine, Bethesda, MD, 1996, pp. 239-243 (5 pages).
Soderland, et al., "Machine Learning of Text Analysis Rules for Clinical Records", Amherst, MA and Brookline, MA, 5 pages.
Starosta, Stanley et al., "Lexicase Parsing: A Lexicon-Driven Approach to Syntactic Analysis", Google, 1986, pp. 127-132 (6 pages).
Stoica, Emilia et al., "Newarly-Automated Metadata Hierarchy Creation", School of Information Management & Systems, University of California, Berkeley; ACM, 2004, pp. 1-4.
Varelas, Giannis et al., "Semantic Similarity Methods in WordNet and their Application to Information Retrieval on the Web", ACM 2005, pp. 10-16. (Year: 2005),.
Wattenberg, Martin et al., "The Word Tree, an Interactive Visual Concordance", Published by IEEE Computer Society, 2008, pp. 1221-1228.
Yang, Yiming et al., "An Application of Least Squares Fit Mapping to Clinical Classification", Section of Medical Information Resources Mayo Clinic/Foundation, Rochester, MN, 1993, pp. 460-464 (5 pages).
Zhou, Xiaohua et al., "Converting Semi-structured Clinical Medical Records into Information and Knowledge", College of Information Science and Technology, Drexel University Department of Surgery, College of Medicine, IEEE, 2005, pp. 1-8 (8 pages).
Zingmond, et al., "Monitoring Free-Text Data Using Medical Language Processing", Computers and Biomedical Research 26, Stanford, CA, 1993, pp. 467-481 (8 pages).

* cited by examiner

MERE-PARSING WITH BOUNDARY AND SEMANTIC DRIVEN SCOPING

CROSS-REFERENCE TO RELATED APPLICATIONS

This application is a continuation of U.S. patent application Ser. No. 16/050,718, filed Jul. 31, 2018, issued as U.S. Pat. No. 10,354,005 on Jul. 16, 2019, which is a continuation of U.S. patent application Ser. No. 14/713,672 filed May 15, 2015, issued as U.S. Pat. No. 10,061,764 on Aug. 28, 2018, which is a continuation of U.S. patent application Ser. No. 13/016,764 filed on Jan. 28, 2011, issued as U.S. Pat. No. 9,063,924 on Jun. 23, 2015, which is a continuation of U.S. patent application Ser. No. 11/735,278 filed on Apr. 13, 2007, issued as U.S. Pat. No. 7,908,552 on Mar. 15, 2011, the entire contents of each are incorporated herein by reference.

TECHNICAL FIELD

The following disclosure relates to methods and computerized tools for parsing input text data.

BACKGROUND

Parsing generally involves processing input text data to obtain a list of parse items that may or may not represent known terms and phrases. Some parse items are associated with modifiers or attributes that tend to describe certainty or temporality of a word being modified. In medical coding, parse items tend to represent medical conditions with the attributes providing appropriate modifications.

SUMMARY

Techniques for implementing a parser are disclosed.

In one aspect, text data is processed to generate one or more parse items. A determination is performed to decide whether one or more of the generated parse items is associated with a boundary based attribute. The determined boundary based attribute is associated with one or more of the other generated parse items that is not blocked from associating with the boundary attribute.

Implementations can optionally include one or more of the following features. The text data is processed to identify identifying one or more boundary markers, and the parse items are generated based on the identified boundary (mere) markers. Identifying the boundary markers can include identifying at least one from a group including a punctuation mark, a word, and a phrase. In addition, processing the text data can include normalizing the received text data to a predetermined text format; morphologically processing the normalized text data to a standardized format; and identifying one or more phrases in the morphologically processed text data to be converted to another standardized format. Further, associating the identified boundary based attribute with one or more of the other generated parse items can include determining a direction to propagate the identified mere attribute across the ordered data structure. The determined direction can include a linear direction to the left of the generated parse item associated with the identified boundary based attribute. Alternatively, the determined direction can include a linear direction to the right of the generated parse item associated with the identified boundary based attribute. Alternatively, the determined direction can further include a linear direction to the left and a linear direction to the right of the generated parse item associated with the identified boundary based attribute. The identified boundary based attribute can be propagated to associate with one or more of the other generated parse items located along the determined direction.

Implementations can further optionally include one or more of the following features. Propagation of the identified mere attribute along the determined direction can be stopped or blocked when a competing boundary based attribute associated with one of the other generated parse items is detected along the determined direction and the detected competing boundary based attribute is of a type same as the identified boundary based attribute. Alternatively, the propagation can be blocked when a predetermined boundary marker is detected. Alternatively, the propagation can be blocked by transforming the identified boundary based attribute to an alternate boundary based attribute based on a detection of a predetermined boundary marker or another boundary based attribute of some type other than that of the identified boundary based attribute. In addition, merging the generated parse items can include receiving a predetermined set of semantic definitions. Two of the generated parse items can be individually compared separately against the received set of semantic definitions to obtain a first semantic match. Also, a combination of the two generated parse items can be compared together against the received set of semantic definitions to obtain a second semantic match. The first and second semantic matches can be compared to determine whether the second semantic match is a better match than the first semantic match, and the two generated parse items can be merged when detected that the second match is a better match.

Implementations can also optionally include one or more of the following features. A determination can be made to decide whether one or more of the generated parse items is associated with a semantic based attribute. One of the other generated parse items can be selected and compared against a predetermined set of semantic definitions to obtain a first semantic match. Also, a combination of the identified semantic attribute and the selected one of the other generated parse items can be compared together against the predetermined set of semantic definitions to obtain a second semantic match. The first and second semantic matches can further be compared to determine whether the second semantic match is better than the first semantic match. The determined semantic attribute is merged with the selected one of the other generated parse items when detected that the second semantic match is better than the first semantic match. Further, merging the parse items can include forming a level in a tree structure so that the parse items are children of a merged parse item created by their merger. Also, merging the semantic attribute with one or more of the remaining generated parse items can include processing the other generated parse items to determine a presence of another semantic attribute associated with one of the other generated parse items. A determination can be made to decide Whether the determined another semantic attribute is of a type same as the identified semantic attribute. Based on the determinations, the identified semantic attribute can be stopped from being merged with the processed one of the other parse items when detected that the determined another semantic attribute is of the type same as the semantic attribute. Further, generating one or more parse items arranged in an ordered data structure can include arranging the generated parse items in at least one from a group including a linked list, an array, a tree, a graph, a stack, and a heap.

The subject matter described in this specification can be implemented as a method or as a system or using computer program products, tangibly embodied in information carriers, such as a CD-ROM, a DVD-ROM, a semiconductor memory, and a hard disk. Such computer program products may cause a data processing apparatus to conduct one or more operations described in this specification.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Techniques for performing mere-parsing with both boundary (mere) condition rules based and semantic rules based propagation or scoping of linguistic attributes are disclosed. While the following describes techniques in context of medical coding, some or all of the disclosed techniques can be implemented to apply to any text or language processing system.

Various implementations of a phrase parser, based on the use of punctuations, conjunctions, prepositions, articles, negatives and relative pronouns, are described in U.S. Pat. No. 6,915,254 ("Automatically Assigning Medical Codes Using Natural Language Processing"), which is incorporated by reference in its entirety. Building upon the techniques described in the U.S. Pat. No. 6,915,254, a process of forming boundaries (or meres) that define parse items of input text data (e.g., a sentence or a phrase) is disclosed. In addition, techniques are implemented to determine the scope of linguistic attributes that can be associated with remaining parse items in the input text data other than the ones in which the attributes are originally associated. The term "attribute" is broadly used in this specification to include a wide range of application dependent modifiers that are not necessarily restricted to just adjectival or adverbial modifiers. For example, an attribute can include various types, such as certainty (e.g., possible, probable, ruled out), temporality (e.g., history of, current, planned), etc. In addition, an attribute can include various application specific modifiers having a scope that extends beyond the locally associated parse items.

The designation of a mere-parser is applied in this specification by using the term, "mere" in context of dividing, limiting or bounding. Alternatively, the term, "mere" is used without qualification. Rather than analyzing sentences according to syntactic rules, a mere-parser establishes boundaries with no syntactic analysis other than recognition of the classes of the word(s) and/or marker(s) that are used to establish boundaries within an input text data. For example, a sentence structure can be quickly resolved into one or more bounded sections that can be reduced, scoped (or propagated), and reconstituted according to boundary and semantic based processes rather than standard syntactic processes.

In some aspects, the mere-parsing techniques as described in this specification is designed to be implemented in conjunction with (and may be dependent on) methods of measuring the semantic correctness of a potential parse item. In particular, the mere-parsing techniques can be implemented to function with techniques described in U.S. Pat. No. 8,682,823 entitled, "Multi-Magnitudinal Vectors with Resolution Based on Source Vector Features," which is incorporated by reference in its entirety.

Mere-Parser System Design

Figure 1A:
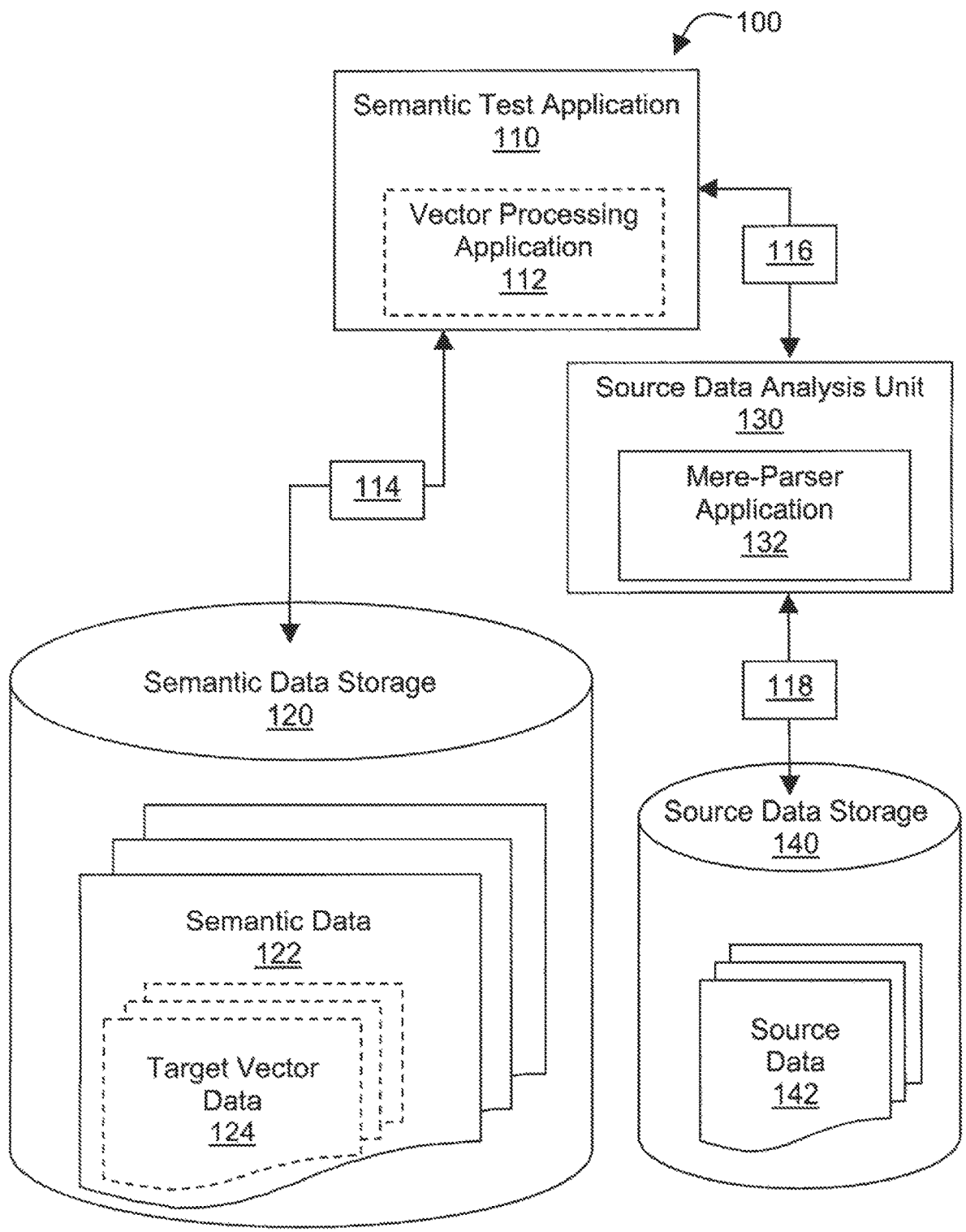
FIG. 1A is a functional block diagram of a mere-parser system.

FIG. 1A is a functional diagram of a mere-parser system 100. The mere-parser system 100 includes a mere-parser application 132. The mere-parser application 132 can be implemented as a part of a source data analysis unit 130. The source data analysis unit 130 and the mere-parse application 132 are communicatively coupled to a source data storage 140 and a semantic test application 110 through bi-directional communication links 118 and 116 respectively. The source data storage 140 is implemented to store source data 142. The semantic test application 110 is coupled to a semantic data storage 120 through a bi-directional communication link 114. The semantic data storage 120 is implemented to store semantic data 122. In some implementations, the semantic test application 110 also includes a vector processing application 112, and the semantic data 122 includes target vector data 124, which are implemented as part of a Multi-Magnitudinal Vector system described in the copending U.S. Pat. No. 8,682,823 entitled, "Multi-Magnitudinal Vectors with Resolution Based on Source Vector Features," incorporated by reference in its entirety.

Figure 1B:
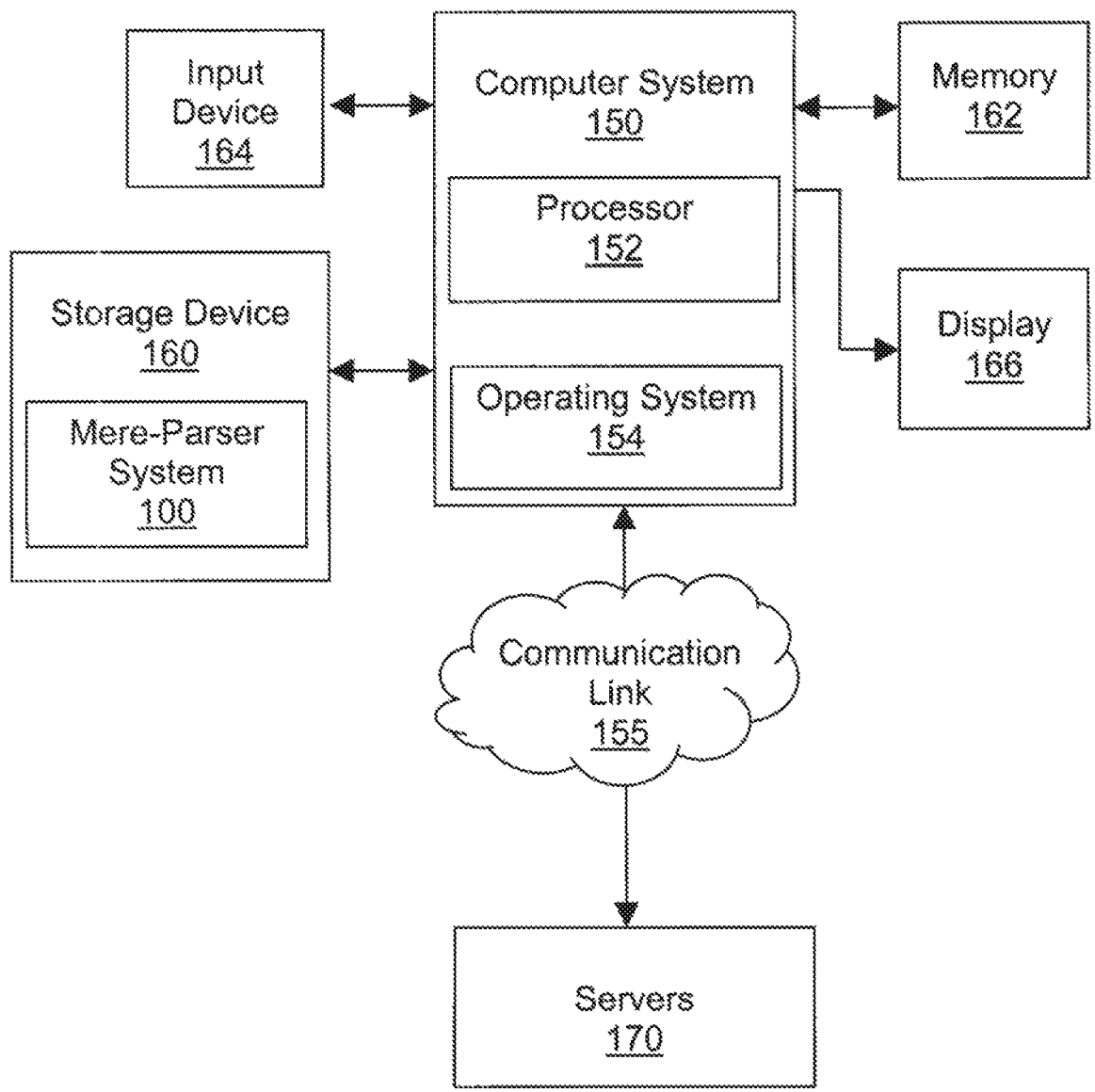
FIG. 1B is a functional block diagram of a mere-parser system executing on a computer system.

FIG. 1B is a block diagram of the mere-parser system 100 implemented as software or a set of machine executable instructions executing on a computer system 150 such as a local server in communication with other internal and/or external computers or servers 170 through a communication link 155, such as a local network or the interne. The communication link 155 can include a wired and/or a wireless network communication protocol. A wired network communication protocol can include local wide area network (WAN), broadband network connection such as Cable Modem, Digital Subscriber Line (DSL), and other suitable wired connections. A wireless network communication protocol can include Wi-Fi, WI MAX, Blue Tooth and other suitable wireless connections.

The computer system 150 includes a central processing unit (CPU) 152 executing a suitable operating system (OS) 154 (e.g., Windows® OS, Apple® OS, UNIX, LINUX, etc.), a storage device 160 and a memory device 162. The computer system can optionally include other peripheral devices, such as an input device 164 and a display device 166. The storage device 160 can include nonvolatile storage units such as a read only memory (ROM), a CD-ROM, a programmable ROM (PROM), erasable program ROM (EPROM) and a hard drive. The memory device 162 can include volatile memory units such as random access memory (RAM), dynamic random access memory (DRAM), synchronous DRAM (SDRAM) and double data rate-synchronous DRAM (DDRAM). An input device can include a keyboard, a mouse, a touch pad and other suitable user interface devices. A display device 166 can include a Cathode-Ray Tube (CRT) monitor, a liquid-crystal display (LCD) monitor, or other suitable display devices. Other suitable computer components such as input/output devices can be included in the computer system 150.

In some implementations, the mere-parser system 100 is implemented as a web application (not shown) maintained on a network server (not shown) such as a web server. The mere-parser system 100 can be implemented as other suitable web/network-based applications using any suitable web/network-based computer programming languages. For example C/C++, an Active Server Page (ASP), and a JAVA Applet can be implemented. When implemented as a web application, multiple end users are able to simultaneously access and interface with the mere-parser system 100 without having to maintain individual copies on each end user computer. In some implementations, the mere-parser system 100 is implemented as a local application executing in a local end user computer or as client-server modules, either of which may be implemented in any suitable programming language, environment or as a hardware device with the application's logic embedded in the logic circuit design or stored in memory such as PROM, EPROM, Flash, etc.

Mere-Parser Application

Figure 1C:
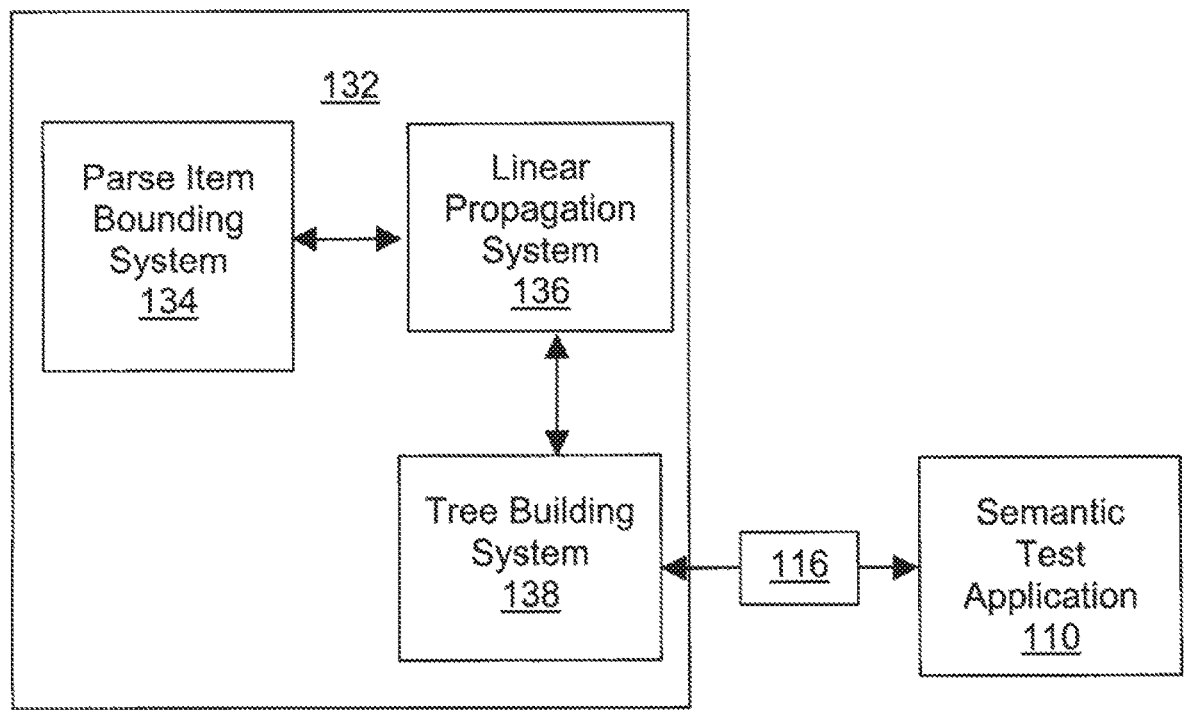
FIG. 1C is a detailed view of a mere-parser application.

FIG. 1C is a detailed view of the mere-parser application 132, which includes a parse item bounding system 134, a linear propagation system 136 and a tree building system 138. The mere-parser application 132 interacts with the semantic test application 110 through the bi-directional communication link 116. The parse item bounding system 134 can be implemented using a combination of finite state automata (FSA) and context-free grammars (CFG), and the linear propagation system 136 and the tree building system 138 can be implemented in C/C++.

Parse Item Bounding System Algorithm

Figure 2:
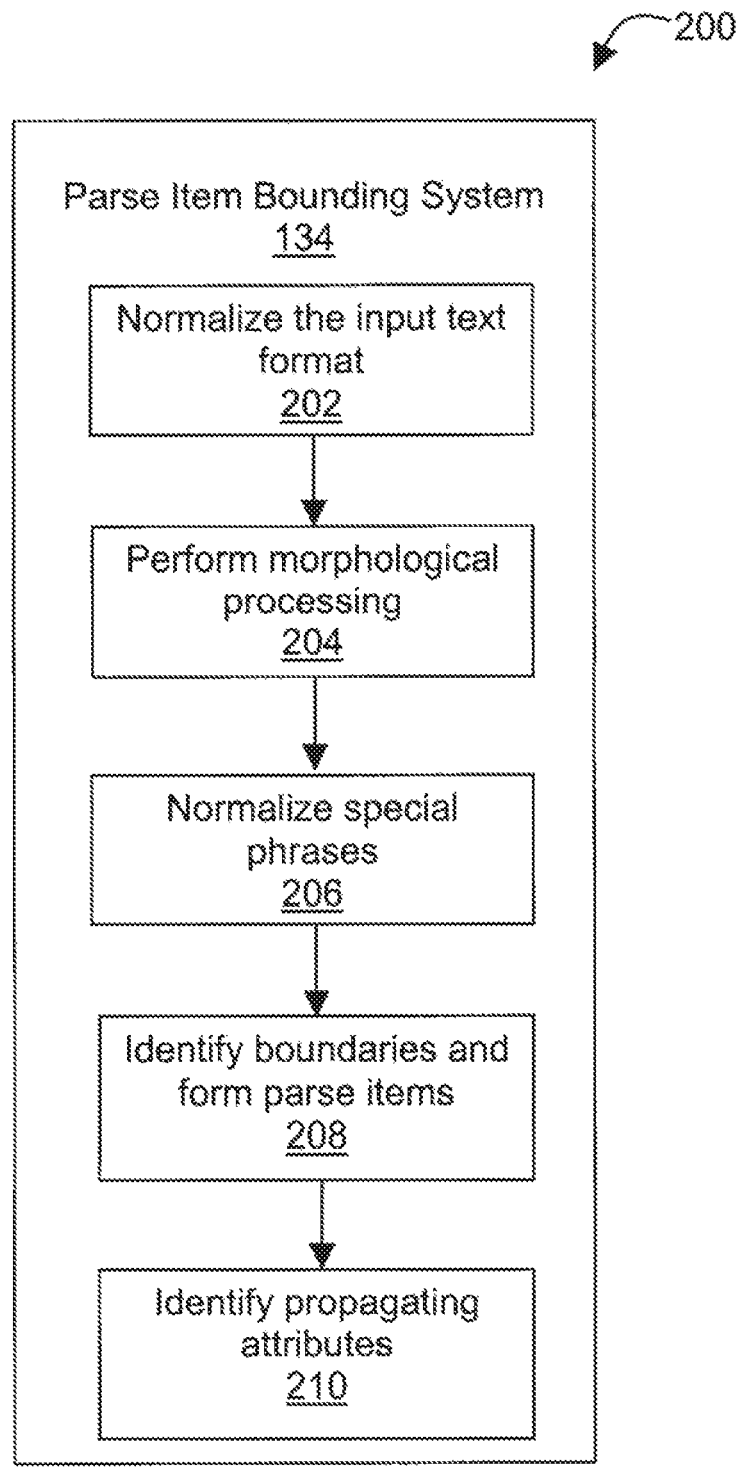
FIG. 2 is a flow chart of a process for implementing a parse item bounding system.

FIG. 2 is a flow chart of process 200 for implementing the parse item bounding system 134. Given a source input text, which includes words, numbers, punctuations and white or blank spaces to be parsed, the parse item bounding system 134 begins by normalizing the source input text to a standardized plain text format at 202. Normalizing to a standardized plain text format can include converting the source input text, which may be in a word processor format (e.g., Word®), XML, HTML or some other mark-up format, to a plain text using either ASCII or some application dependent form of Unicode. The normalization process also includes detecting and converting the white spaces so that words and punctuation in the source input text appear with a uniform type and uniform amount of white space between the words, punctuation and between paragraphs in the source input text. In addition, the source input text is processed to preserve the page format and text alignments, and is represented in a standardized format.

The normalized input text is morphologically processed at 204 by morphing the words, numbers, acronyms, etc. in the input text to one or more predetermined standardized formats. Morphological processing can include stemming, normalizing units of measure to desired standards (e.g. SAE to metric or vice versa) and contextually based expansion of acronyms. The normalized and morphologically processed input text is processed to identify and normalize special words or phrases at 206. Special words or phrases that may need normalizing can include words or phrases of various types such as temporal and spatial descriptions, medication dosages, or other application dependent phrasing. In medical texts, for example, a temporal phrase such as "a week ago last Thursday" can be normalized to a specific number of days (e.g., seven days) and an indication that it is past time.

At 208, the parse item bounding system 134 is implemented to identify boundaries or boundary markers in the processed input text and parse the input text to generate one or more parse items based on the identified boundary markers. The generated parse items are arranged in an ordered data structure, such as a linked list of parse items ordered from left to right. In some implementations, the data structure for representing the bounded input text as an ordered list of parse items includes arrays, trees, graphs, stacks, heaps or other suitable data structure that maintains an ordered view of the generated parse items. A boundary marker may be one or more punctuation marks, words or patterns of words (e.g., conjunctions, prepositions, articles, negatives and relative pronouns.) In some implementations, boundaries can optionally include modals and some limited set of application specific content words.

Once the parse items are generated, boundary based attributes that propagate are identified at 210. A boundary based attribute includes a wide range of application dependent modifiers associated with one or more of the generated parse items that are not necessarily restricted to just adjectival or adverbial modifiers. In addition, a boundary based attribute can be identified as one of various types such as certainty (e.g., possible, probable, ruled out), temporality (e.g., history of, current, planned), or other application specific attributes that may have scope that extends beyond the associated parse item. Further, words and/or punctuation patterns in the generated parse items are analyzed to determine, to the degree possible, whether the identified attribute should propagate (or associate) to the other parse items located to the left, right or in both directions of the parse item associated with the identified boundary based attribute. Some boundary attributes are determined to not associate with other parse items in the linked list. For example, a parse item that contains a propagating attribute begins with a modal and is followed by the end of the linked list (e.g., a period that ends a sentence in the input text) is determined to propagate to the left of the parse item associated with the propagating attribute. Each parse item is a data structure in a linked list that can later become a tree. In addition, each parse item structure has an element that contains the text of the parse item as well as elements to store information about the feature that selected the boundary and information about the semantic content of the parse item as the information is identified.

Linear Propagation System Algorithm

Figure 3A:
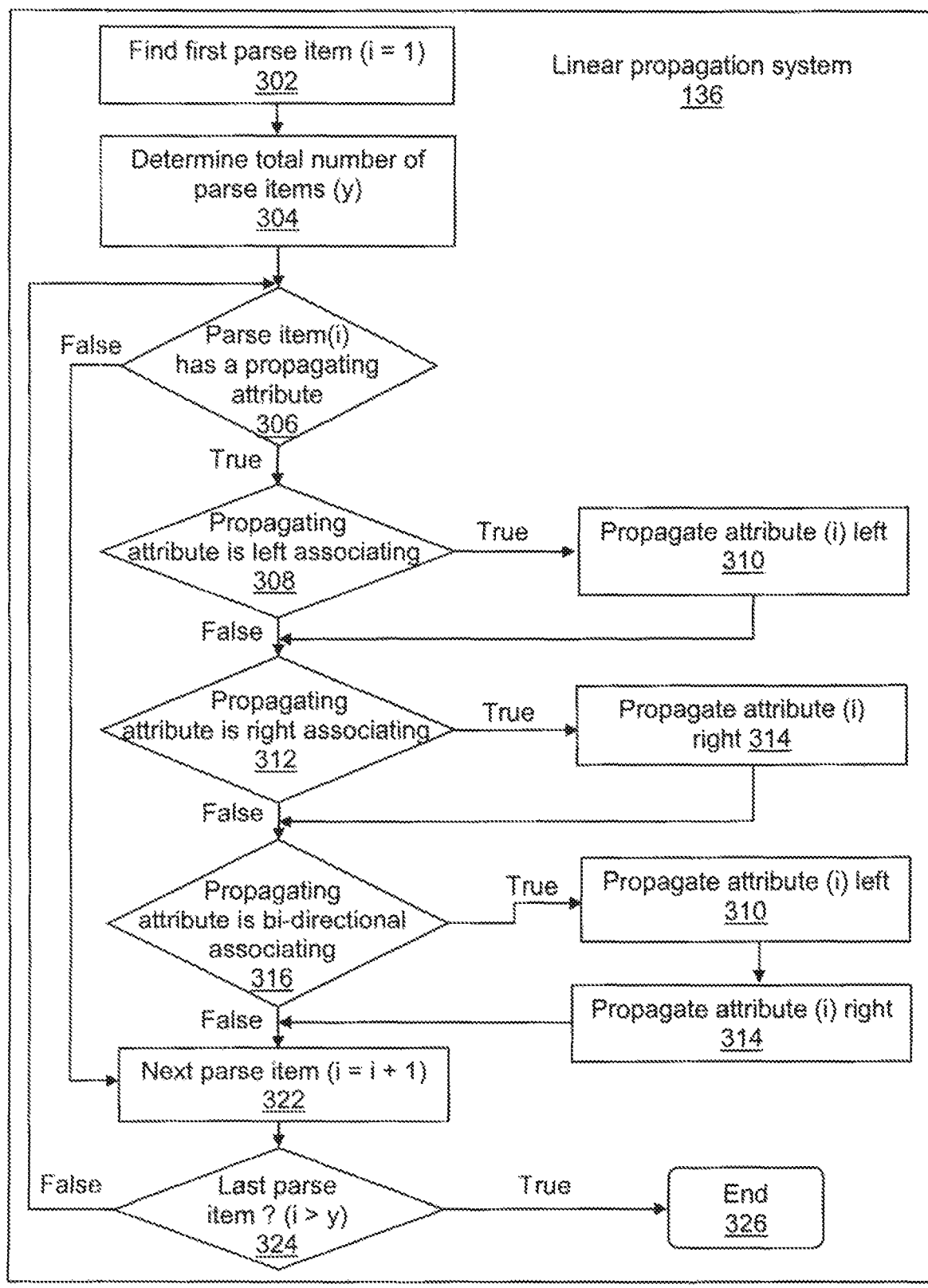
FIG. 3A is a flow chart of a process for implementing a linear propagation system.
Figure 3B:
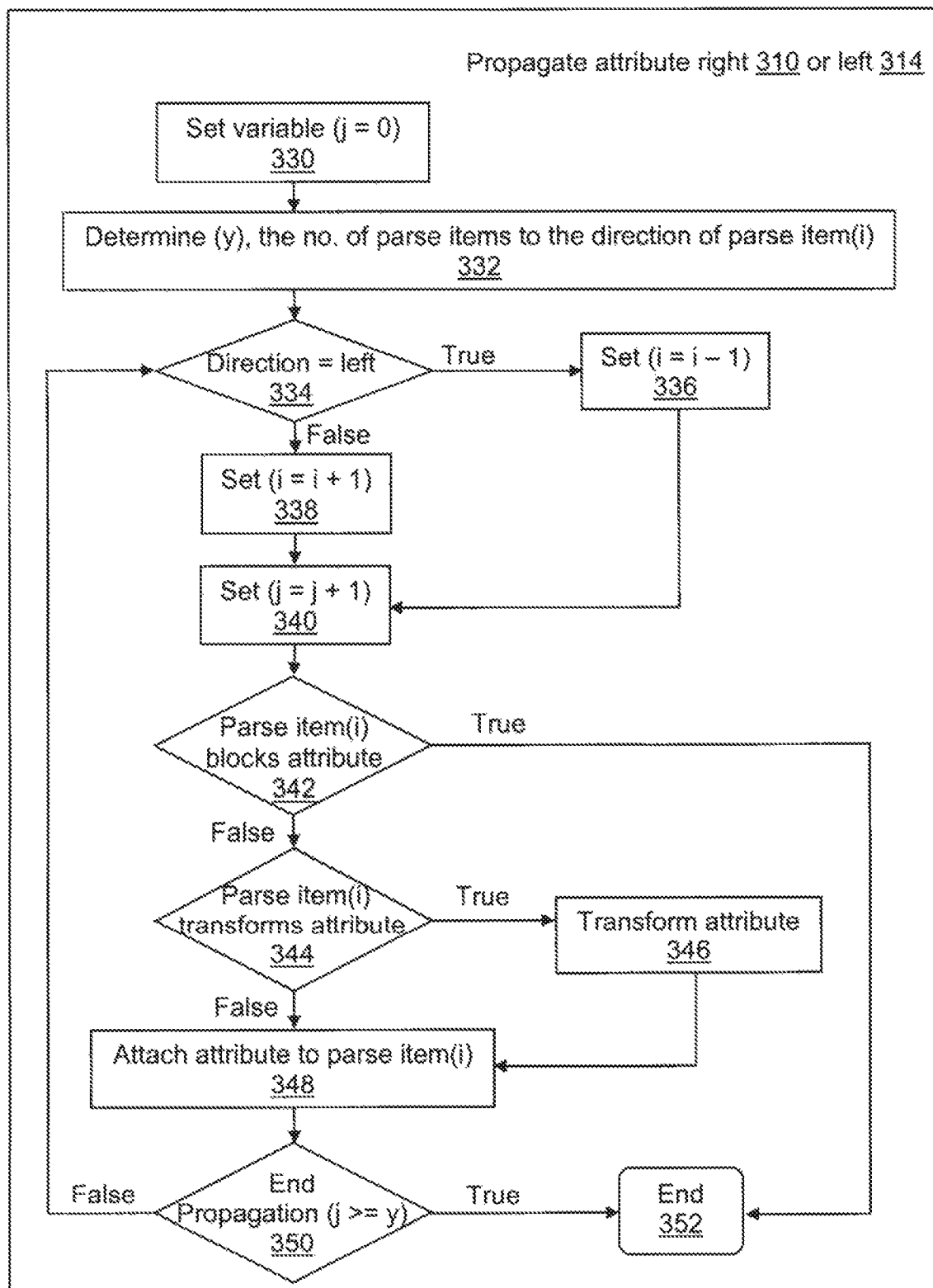
FIG. 3B is a flow chart showing a detailed view of a propagate attribute process.

FIGS. 3A and 3B are flow charts illustrating a process of implementing the linear propagation system 136. The process is iterative and begins by identifying the first parse item in the linked list of parse items generated from the processed input text at 302. A variable (i) is used to keep track (e.g., by using a flag) of each parse item during the iteration. The variable (i) is initially set to "1" to indicate that the first parse item is being analyzed. The linked list of parse items is also analyzed to determine the total number of parse items included in the linked list at 304. A variable (y) is used to represent the determined total number of parse items. The linear propagating system 136 iterates through the linked list, from the first parse item (e.g., beginning of the input text) to the last parse item, testing each parse item to determine whether the parse item (i) under analysis has a propagating attribute associated with the parse item at 306. If the parse item (i) under analysis is associated with a propagating attribute, the attribute associated with parse item (i) is analyzed to determine the direction of propagation (or association) at 308, 312 and 316. If the direction of propagation is determined to be backward (left) 308 toward the first parse item in the linked list, the attribute associated with parse item (i) is further associated with the remaining parse items located to the left of the parse item (i) under analysis at 310. Otherwise if the direction of propagation is determined to be forward (right) 312 toward the last parse item in the linked list, the attribute associated with parse item (i) is further associated with the remaining parse items located to the right of the parse item (i) at 314. Otherwise if the direction of propagation is determined to be bi-directional (i.e., both left and right) 316, the attribute associated with parse item (i) is further associated with the remaining parse items located both to the right and left of the parse item (i) at 310 and 314 respectively If the parse item (i) is not associated with a propagating attribute, the next parse item (i+1) in the linked list is identified and analyzed at 322 to determine whether the next parse item (i+1) is associated with a propagating attribute at 306. Processes 308, 310, 312, 314 and 316 are repeated for the next parse item (i+1) to determine the direction of propagation as described previously. The iterative analysis continues until each and every parse item has been analyzed. When the variable (i) is greater than (y), the linear propagation system 136 determines that the last parse item has been analyzed at 324. Then the iteration ends at 326.

FIG. 3B is a flow chart further describing in detail the iterative processes of associating the identified propagation attribute either to the left 310 or the right 314. Propagating the attribute to the left 310 or the right 314 is accomplished using one common iterative process. At 330, a variable (j) is set to zero (j=0) and used to keep track of the other remaining parse items to potentially associate the identified propagating attribute. At 332, the total number (y) of parse items located in the direction of the parse item (i) is determined. If the direction of propagation is determined to be left propagating at 334, the variable (i) is decremented (i=i−1) to indicate selection of the next parse item immediately to the left (or in front) of the parse item (i) at 336. Otherwise, the direction of propagation is determined to be right propagating and the variable (i) is incremented (i=i+1) to indicate selection of the next parse item immediate to the right of parse item (i). Once the variable (i) is either decreased 336 or increased 338, the variable (j) is incremented (j=j+1) to indicate that one of the remaining parse items in the left or right direction is being analyzed at 340.

The selected next parse item in the determined direction (either to the left (i=i−1) or right of the parse item (i=i+1)) is analyzed to determine whether the selected next parse item blocks association of identified propagating attribute at 342. If the propagating attribute is blocked at 342, then the iterative process to propagate the attribute ends at 352. The criteria for blocking an attribute are application specific. Using medical text application as an example, in the statement 'The patient has possible COPD and probable pneumonia," the right propagating attribute "possible" is blocked from associating with the next parse item, "and probable pneumonia" by a preexisting attribute "probable" already associated with "and probable pneumonia." In this example, the basis of blocking attribute is due to a competing attribute of the same certainty class or type already associated with the next parse item. In addition, presence of certain boundary markers can block attribute association and thus end the iteration. Punctuation marks (e.g., periods, question marks, exclamation marks, colons, etc.) are the most common boundary markers that can block propagation.

Alternatively, if the determination, parse item (i) blocks attribute 342, evaluates to false, the selected next parse item is analyzed to determine whether the selected next parse item transforms the propagating attribute at 344. If the selected next parse item is determined to transform attribute, then the attribute is transformed at 346 based on one or more features of the selected next parse item. Transforming the attribute 346 is also application specific. Continuing the medical text example with the input text "The patient has possible COPD but not pneumonia," the "but not" of the "but not pneumonia" would have the effect of transforming "possible" to "not possible" or to a medically appropriate terminology, such as "ruled out." Thus, boundary markers, such as conjunctions (e.g., "but") and prepositions can transform attributes. Once the attribute is transformed at 346, the transformed attribute is associated with the selected next parse item at 348. Otherwise, if the attribute is not determined to be transformed at 344, the attribute is associated with the next parse item at 348 without being transformed. At 350, the variable (j) is compared to the variable (y) to determine if each and every remaining parse item in the determined direction has been analyzed. If the determination at 350 is returned as true, then the iterative process ends. Otherwise, the iterative process is repeated beginning at 334 until either the beginning or end of the linked list (or some other ordered list) of the parse items is reached.

Various classes of attributes are possible, depending on the application. Typically, attributes are modifiers that are not core to the definition of the entries in a knowledge base (e.g., a target vector set). In the example above, target vectors exist for "pneumonia" and "COPD", but not for "possible pneumonia", "probable pneumonia", "ruled out pneumonia", etc. "Possible", "probable" and "ruled out" are instead treated as attributes that can attach to various medical conditions that are described in the knowledge base. Attributes are classified according to both semantic similarity (e.g., the class, "certainty" can also include "possible," "probable," and "ruled out") and also on shared set of blocking and transformation criteria. The criteria for blocking and transforming attributes can be developed either manually or derived by some automated process such as a statistical analyzer.

Tree Building System Algorithm

Figure 4A:
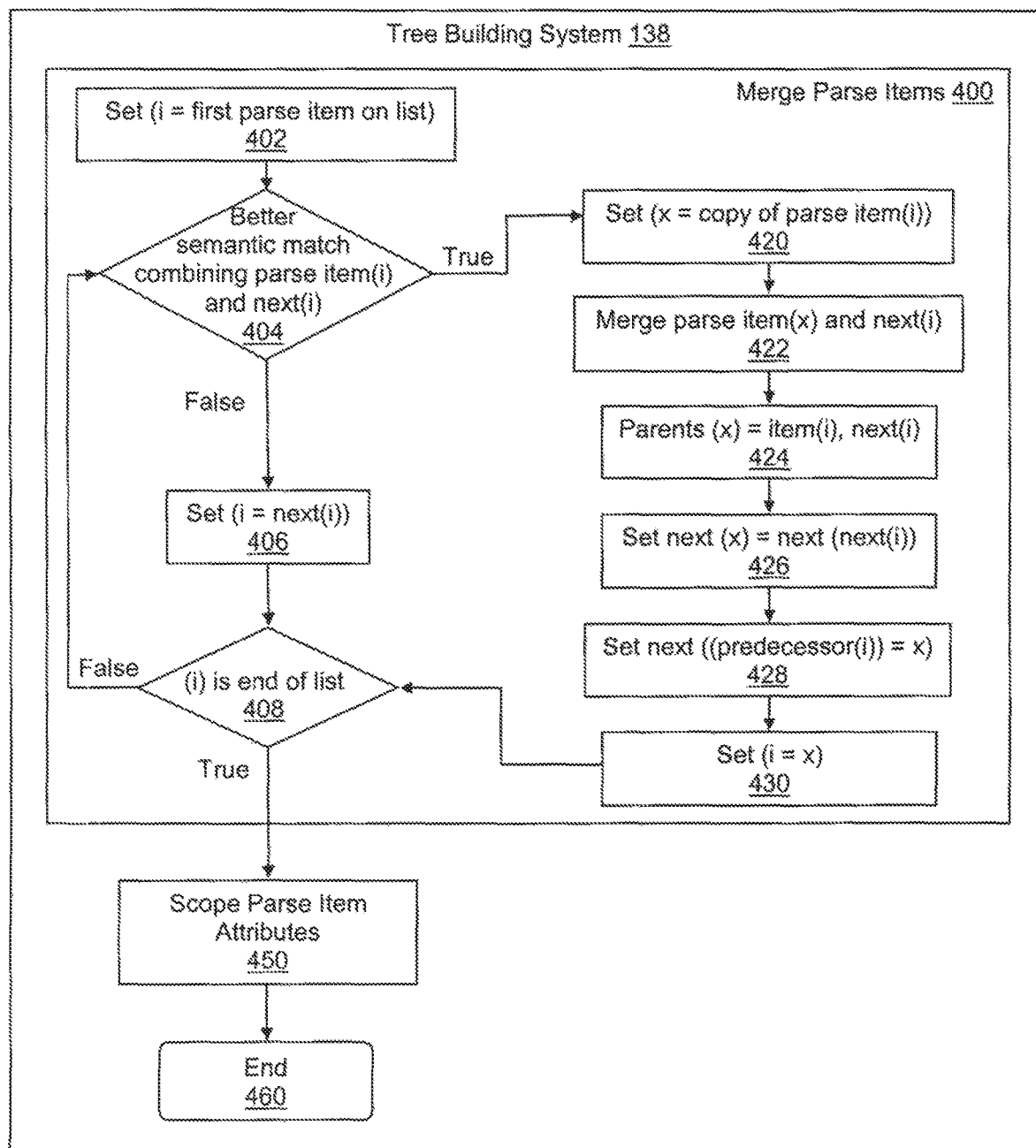
FIG. 4A is a flow chart showing a detailed view of a tree building system.
Figure 4B:
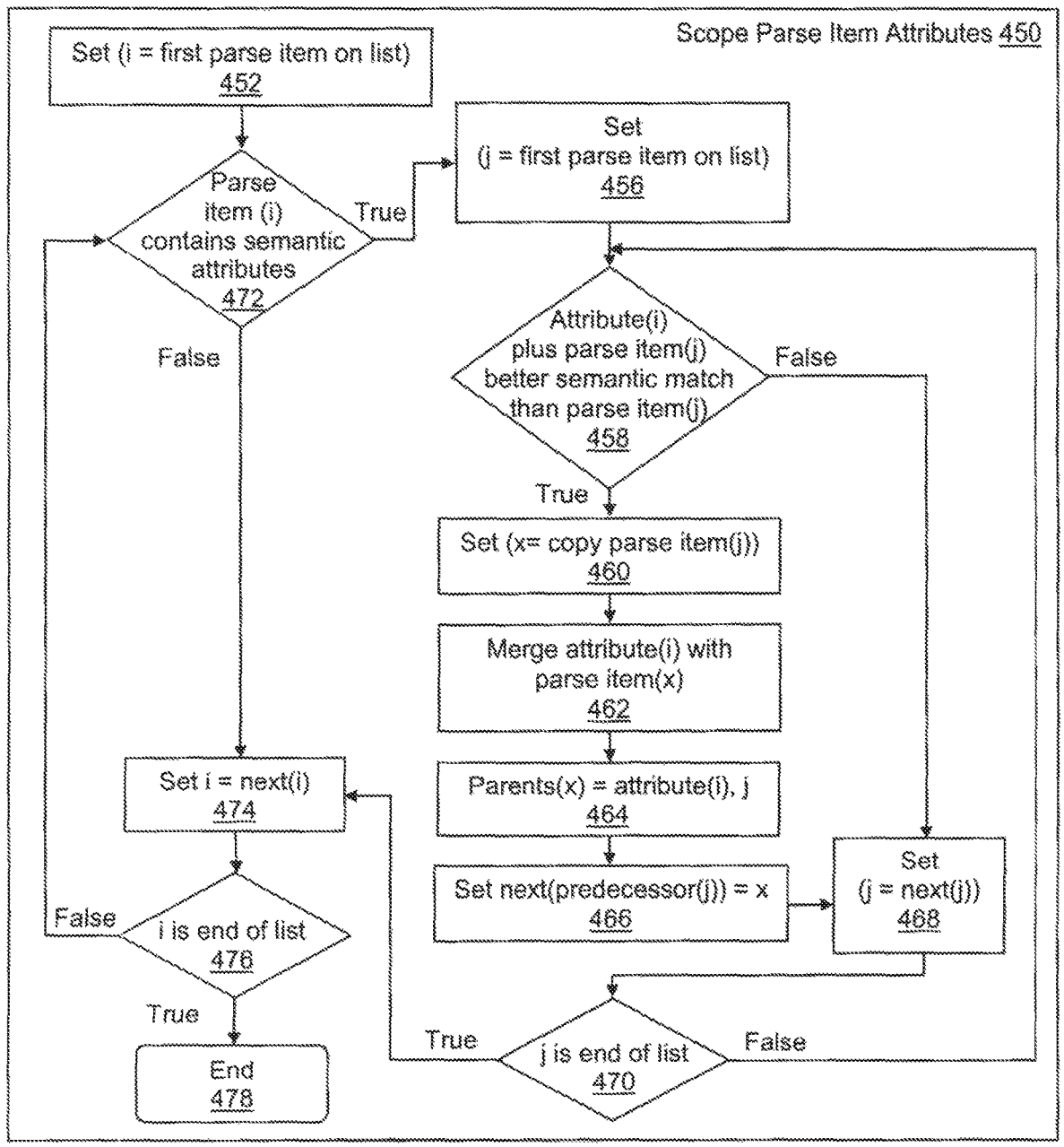
FIG. 4B is a flow chart showing a scope parse item attribute process of a tree building system.

FIG. 4A and FIG. 4B are flow charts depicting a process of implementing the tree building system 138, which includes two iterative processing blocks: a merge parse items process 400, and a scope parse item attributes process 450. While FIG. 4A shows the merge parse items process 400 being performed before the scope parse item attributes process 450, the order of these two processing blocks is interchangeable depending on the demands of the application. In some implementations, one or both of the process 400 and 450 can be repeated.

FIG. 4A shows the merge parse items process 400 in detail. The process 400 processes (e.g., in an iterative manner) through the parse items in the linked list (or other ordered structure) identified in the input text from left to right (or right to left, or top to bottom, etc. depending on the natural reading order of the language being processed) to test each adjacent parse item. At 402, the first parse item on the linked list is identified and set to (i). The iterative process 400 analyzes each of the parse items, starting from the first parse item (i), in the linked list against the immediately adjacent parse item, next (i), in a determined direction of iteration (either left or right). At 404, the merge parse items process 400 interacts with the semantic test application 110 to access a predetermined set of target semantic data definitions 122 stored in the semantic data storage 120. The text of each parse item (i) and the adjacent parse item, next (i), are compared against the target semantic data definitions 122 to obtain individual semantic matches. Also, the combined text of the parse items (i) and next (i) is also compared against the target semantic data definitions 122 to obtain a merged semantic match. A determination is made whether compared to the semantic match of either parse item (i) or next (i), a better semantic match is obtained by combining parse items (i) and next (i). The determination of a better semantic match is based on a test of the semantic goodness of the merged parse items as matched against the items of the semantic data set 122 that determines whether a merger will be performed or not. If the determination at 404 is true, then the parse items (i) and next (i) are merged together. Otherwise, if the determination at 404 is false, then the iteration continues at 406 by selecting the next two adjacent parse items.

Merging the parse items (i) and next (i) is performed by first creating a new parse item (x) as a copy of the parse item (i) at 420. The newly created parse item (x) merged with the adjacent parse item, next (i) at 422. Based on the merged parse items, a tree. structure is constructed by setting the parent of parse item (x) to parse item (i) and next (i) at 424. A tree structure allows the hierarchical nature of a data structure to be represented in a graphical form. The names of relationships between nodes are modeled after family relations (e.g., parent and children). The starting node is often named the root. In a tree, a parent is a node that has one or more children nodes such that the parent of a child is one level closer to the root (i.e., at a higher level in the hierarchy) of the tree and each child has one and only one parent node. Parse item (x) takes the place of parse item (i) in the parse item list at 430 by reassigning the next value for the parse item preceding item (i) at 428, and assigning the next value for parse item (x) to the next value of next (i) at 426. When merging parse items, the manner in which semantic attributes are individually handled depends on the type or class of the attribute. For example, ordinal modifiers may be accumulated in a list as when merging parse items in the statement "fracture of the fifth, sixth and seventh left ribs." Cardinals may be subjected to an application specific mathematical equation. For example, the lengths of wounds may be summed as required for medical coding. If there is ambiguity or a conflict between any of the semantic attributes of the parse items being merged, such ambiguity is resolved by reference to a priority hierarchy for each class of semantic attributes. When the end of the parse list is reached at 408, the iterative process continues to the scope parse item attributes process 450. If the scope parse item attributes process 450 has already been completed, then the iterative process ends at 460.

In some implementations the iterative process 400 to merge parse items continues until no more merges can take place. In addition, the number of parse items being tested and merged can be varied (e.g., three instead of just two). Further, the process of merging attributes is not limited to immediately adjacent parse items. The iterative process 400 can be implemented to test and merge non-adjacent parse items (two or more at a time).

FIG. 4B shows the iterative process of implementing the scope parse item attributes process 450. Whereas the linear propagation system 136 deals with attributes that are scoped (propagated) according to the boundary markers that define each parse item, the scope parse item attributes process 450 deals with attributes that are scoped based on semantic rules. For example, the two sentence fragments "lacerations and contusions of the shoulder and thigh" and "headaches and contusions of the shoulder and thigh" are syntactically identical and thus both can be bounded to generate parse items in similar manners. However, a semantic analysis of the two results in different number of medical conditions. The first sentence fragment yields four specific types of medical conditions ("lacerations of the shoulder", "lacerations of the thigh", "contusions of the shoulder" and "contusions of the thigh") whereas the second yields only three ("headaches", "contusions of the shoulder" and "contusions of the thigh"). Broadly viewed, attributes that scope/propagate according to boundary markers (bounding conditions) tend to be ancillary modifiers whereas semantically scoped attributes are mostly intrinsic to the definition of some condition or state of nature.

The scope parse item attributes process 450 iteratively processes all of the semantic attributes associated with the parse items in the linked list. At 454, the first parse item in the linked list is identified and assigned to variable (i). A determination is made at 472 to decide whether the parse item (i) is associated with one or more semantic attributes. If the determination at 472 is true, then processes 456, 458, 460, 462, 464, 466, 468 and 470 are performed to merge the semantic attributes with the parse items.

At 456, a variable (j) is also assigned to the first parse item. At 458, the scope parse item attributes process 450 interacts with the semantic test application 110 to access a predetermined set of target semantic data definitions 122 stored in the semantic data storage 120. The text of the parse item (j) is compared against the target semantic data definitions 122 to obtain an individual semantic match. Also, the combined text of the attribute (i) and the parse item (j) is also compared against the target semantic data definitions 122 to obtain a merged semantic match. A determination is made whether compared to the semantic match of the parse item (j), a better semantic match is obtained by combining the attribute (i) and the parse item (j). The determination of a better semantic match is based on a test of the semantic goodness of the merged parse items as matched against the items of the semantic data set 122 that determines whether a merger will be performed or not.

If the determination at 458 is true, then the attribute is merged with the parse item (j). At 460, a copy of the parse item (j) is generated and set to variable (x), and the attribute (i) is merged with parse item (x) at 462. Once the merger is accomplished, a tree is constructed by setting parents of parse item (x) to attribute (i) and parse item(j) at 464. Parse item (x) takes the place of parse item (j) in the parse item list by reassigning the next value for the parse item preceding parse item (j) at 466. The iterative process continues by selecting the next parse item (j=next (j)) at 468. Otherwise, if the determination at 458 is false, then iterative merge process (456, 458, 460, 462, 464, 466, 468 and 470) is not performed and the next parse item is selected at 468. If the end of the parse item list is reached (j is end of list), then the iterative merge process ends for the semantic attribute (i).

If the determination at 472 is false (parse item (i) is not associated with one or more semantic attributes), then the process 450 iterates to the next parse item (i) at 474 to determine whether that next parse item, next (i), is associated with one or more semantic attributes. If the end of the parse item list is reached at 476, the iterative process 450 ends at 478. Otherwise, if there are still additional parse items remaining in the linked list, the iterative process 450 repeats from 472 to analyze the next parse item, next (i).

In some implementations, the determination at 458 to test the semantic goodness of a merger is blocked if parse item (j) already has a semantic attribute of the same type (e.g., certainty, temporality, etc.) as the attribute (i) that the iterative process 450 is attempting to merge. This, however, is primarily for the sake of enhancing processing speed rather than improving the quality of the linguistic processing. Consider again the example described above in which "headache" has an anatomic location for the condition "ache" intrinsically associated with "head." In such implementations, an attempt at matching "headache of the shoulder" or "headache of the thigh" is blocked on the basis that the anatomic site of "ache" is already defined. However, since neither "headache of the shoulder" nor "headache of the thigh" would have a medical definition, the only adverse effect of attempting a match may be the added processing time that is wasted. In addition, the iterative process 450 can be repeated until no further merges can take place.

While attributes are handled by the linear propagation system 136 and are tangential to the definitions in the knowledge base, the seeping that takes place in the tree building system 138 handles the merging of information that is core to the definitions in the knowledge base. Extending the example above to "mild lacerations and contusions of the shoulder and thigh", the modifier "mild" is an attribute that scopes (propagates) to both lacerations and contusions. The seeping by which the system arrives at "shoulder lacerations", "shoulder contusions", etc. is semantically driven by the content of the knowledge base that identify "lacerations" and "contusions" as medical injuries, and "shoulder" and "thigh" as anatomic locations that can correctly be used to specify the particular injuries. The line between attributes and definitional core knowledge, however, can at times be blurred. For example, adjectives such as "acute" and "chronic" are most often handled as attributes, but they are occasionally core to the definitions of particular medical conditions as in "chronic obstructive pulmonary disease" (COPD). The multi-magnitudinal vector system as described in the U.S. Pat. No. 8,682,823 resolves this ambiguity, and further examples of attribute vs. core knowledge are also discussed in detail.

The data structure that results from the tree building system 138 is a tree, the leaves of which are the original parse items for the input text (e.g., a sentence) and the level closest to the root is the final result of the tree building system 138. This data structure preserves a trace of the process with all original and intermediate data that may be useful either for later processing or for system debugging. Other structures are possible, and preserving the original and intermediate data is optional.

Computer Implementations

In some implementations, the techniques for implementing a mere-parser as described in FIGS. 1A to 4B can be implemented using one or more computer programs comprising computer executable code stored on a computer readable medium and executing on the mere-parser system 100. The computer readable medium may include a hard disk drive, a flash memory device, a random access memory device such as DRAM and SDRAM, removable storage medium such as CD-ROM and DVD-ROM, a tape, a floppy disk, a CompactFlash memory card, a secure digital (SD) memory card, or some other storage device.

In some implementations, the computer executable code may include multiple portions or modules, with each portion designed to perform a specific function described in connection with FIGS. 1A to 4B above. In some 30 implementations, the techniques may be implemented using hardware such as a microprocessor, a microcontroller, an embedded microcontroller with internal memory, or an erasable programmable read only memory (EPROM) encoding computer executable instructions for performing the techniques described in connection with FIGS. 1A to 4B. In other implementations, the techniques may be implemented using a combination of software and hardware.

Processors suitable for the execution of a computer program include, by way of example, both general and special purpose microprocessors, and any one or more processors of any kind of digital computer, including graphics processors, such as a GPU. Generally, the processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of embodiments have been described. Nevertheless, it will be understood that various modifications may be made without departing from the spirit and scope of the claims. Accordingly, other embodiments are within the scope of the following claims.

What is claimed is:

1. A computer-implemented mere-parser system comprising:
   a parse item bounding system configured to:
      normalize source input text to a standardized plain text format;
      identify special words or phrases within the normalized source input text, wherein the special words or phrases include temporal and spatial descriptions and/or medication dosages;
      identify boundary markers in the normalized special words or phrases;
      generate one or more parse items based on the identified boundary markers; and
      identify boundary-based attributes that propagate;
   a linear propagation system, communicatively coupled with the parse item bounding system, configured to iteratively determine:
      whether each of the one or more parse items includes a propagating attribute; and
      a direction of the propagating attribute; and
   a tree building system, communicatively coupled with the linear propagation system, configured to generate a merged parse item from at least two of the parse items.

2. The system of claim 1, wherein boundary-based attributes comprise a certainty or a temporality.

3. The system of claim 1, wherein the boundary-based attributes that propagate comprise application-dependent modifiers associated with one or more of the parse items.

4. The system of claim 1, wherein the parse item bounding system is further configured to arrange the parse items in an ordered data structure.

5. The system of claim 4, wherein the ordered data structure comprises a linked list of parse items ordered from left to right.

6. The system of claim 4, wherein the ordered data structure comprises a linked list of parse items arranged in one or more arrays, trees, graphs, stacks or heaps.

7. The system of claim 5, wherein the tree building system is configured to generate the merged parse item by:
   accessing a predetermined set of target semantic data definitions; and
   comparing each of the parse items and respective immediately adjacent parse items in the linked list in the direction of the propagating attribute against the target semantic data definitions to obtain individual semantic matches.

8. The system of claim 7, wherein the tree building system is further configured to:
   combine each of the parse items and respective immediately adjacent parse items to form merged parse items; and
   compare the merged parse items against the target semantic data definitions to obtain a merged semantic match.

9. The system of claim 7, wherein the predetermined set of target semantic data definitions is stored in a semantic data storage device communicatively coupled with the tree building system via a semantic test application.

10. The system of claim 1, wherein the boundary markers comprise one or more punctuation marks, words, conjunctions, prepositions, articles, negatives, relative pronouns, or combinations thereof.

11. The system of claim 1, wherein the direction of the propagating attribute is left, right or bidirectional.

12. The system of claim 11, wherein the linear propagation system is further configured to:
   determine a total number of parse items located in the direction of the propagating attribute; and
   decrement the total number of parse items by one if the direction is left; or
   increment the total number of parse items by one if the direction is right.

13. The system of claim 12, wherein the linear propagation system is further configured to:
   select a next parse item in the direction of the propagating attribute; and
   determine whether the next parse item blocks an association of the propagating attribute.

14. The system of claim 13, wherein if the next parse item does not block the association of the propagating attribute, the linear propagation system is further configured to determine whether the next parse item transforms the propagating attribute.

15. The system of claim 1, wherein the tree building system is further configured to form a portion of a tree data structure by arranging the merged parse item as a parent of the at least two of the parse items.

16. The system of claim 1, wherein the parse item bounding system is further configured to morphologically process the normalized source input by morphing words, numbers, acronyms, or combinations thereof into a predetermined standardized format.

17. The system of claim 16, wherein the parse item bounding system is further configured to morphologically process the normalized source input by stemming, normalizing units of measure to desired standards, or combinations thereof.

18. The system of claim 1, wherein the parse item bounding system is implemented using a combination of finite state automata and context-free grammars.

19. The system of claim 1, wherein the linear propagation system and the tree building system are each implemented in C/C++.

20. The system of claim 1, wherein the source input text comprises words, numbers, punctuations, white or blank spaces, or combinations thereof.

* * * * *